United States Patent [19]
Attix

[11] Patent Number: 5,669,729
[45] Date of Patent: Sep. 23, 1997

[54] RECONSTITUTABLE ROD CLUSTER CONTROL ASSEMBLY

[75] Inventor: Douglas J. Attix, Lynchburg, Va.

[73] Assignee: Framatome Cogema Fuels, Lynchburg, Va.

[21] Appl. No.: 584,524

[22] Filed: Jan. 11, 1996

[51] Int. Cl.⁶ .................... G21C 7/00; G21C 3/32
[52] U.S. Cl. ................... 403/282; 403/315; 403/6; 403/11; 376/327; 376/446
[58] Field of Search .................. 376/327, 446; 403/11, 6–8, 320, 315, 279, 274, 282

[56] References Cited

U.S. PATENT DOCUMENTS

| | | |
|---|---|---|
| 2,671,682 | 3/1954 | Page . |
| 4,147,589 | 4/1979 | Roman et al. . |
| 4,292,131 | 9/1981 | Suzuki . |
| 4,366,116 | 12/1982 | Christiansen et al. ............... 376/446 |
| 4,481,164 | 11/1984 | Bollinger . |
| 4,684,503 | 8/1987 | Shallenberger ............... 376/446 |
| 4,752,434 | 6/1988 | Savary . |
| 4,753,769 | 6/1988 | Savary . |
| 4,755,346 | 7/1988 | Savary . |
| 4,778,645 | 10/1988 | Altman et al. . |
| 4,885,123 | 12/1989 | Ikeuchi et al. . |
| 4,928,291 | 5/1990 | Mouesca et al. ............... 376/327 |
| 5,110,535 | 5/1992 | Dillmann . |
| 5,141,711 | 8/1992 | Gjertsen et al. . |
| 5,183,626 | 2/1993 | Denizou . |
| 5,331,675 | 7/1994 | Hosoya et al. . |

FOREIGN PATENT DOCUMENTS 140732  4/1951  Australia ................... 403/320

*Primary Examiner*—Anthony Knight
*Attorney, Agent, or Firm*—Rhodes Coats & Bennett, L.L.P.

[57] ABSTRACT

A rod connector assembly for removably securing a control rod to a spider structure and adapted for use in conjunction with a crimping tool. The rod connector assembly includes a tubular boss fixedly secured to the spider structure, the boss including at least one access hole and interior threads formed on an interior surface of the boss. A securement structure includes a coupling adapted to be fixedly secured to the control rod. The coupling includes a shaft having external threads, an upper end, and a lower end, the lower end of the shaft adapted to be fixedly secured to the control rod; a deformable collar projecting upwardly from the upper end of the shaft; and a cap adapted to be fixedly secured to an upper end of the boss and including at least one groove corresponding to the access hole(s). In use, when the external threads are engaged with the interior threads, the deformable collar is disposed within the boss and is accessible through the access hole(s) so that the deformable collar may be deformed using the crimping tool from exteriorly of the boss to form a crimped region. As a result the crimped region resists rotation of the external threads with respect to the internal threads unless it is overcome with a predetermined amount of torque to permit disassembly of the rod connector.

4 Claims, 2 Drawing Sheets

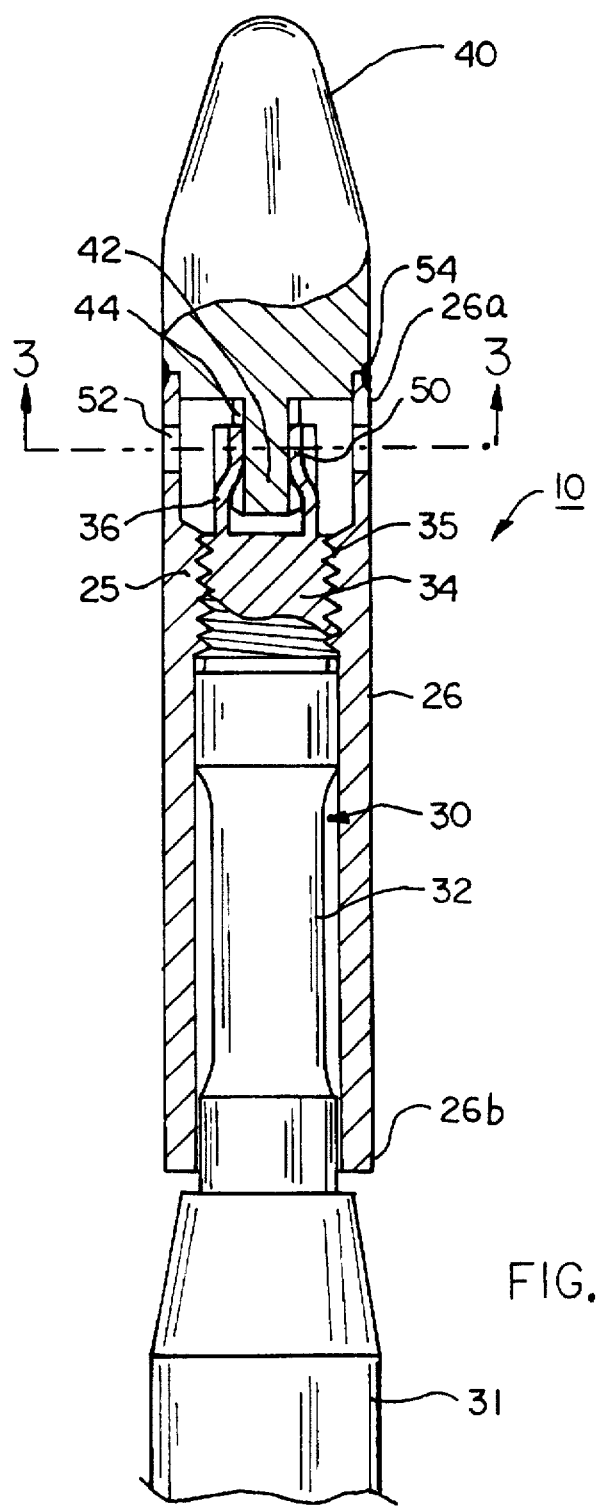
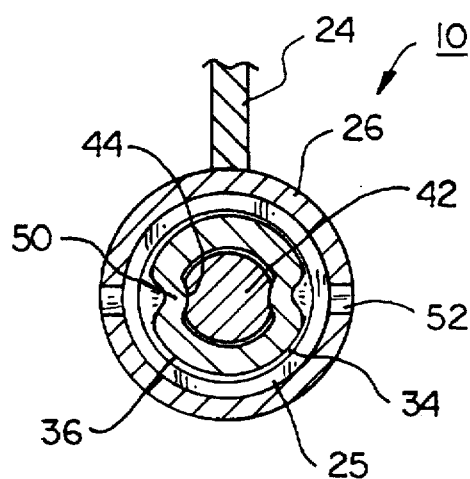

RECONSTITUTABLE ROD CLUSTER CONTROL ASSEMBLY

BACKGROUND OF THE INVENTION (1) Field of the Invention

The present invention relates generally to rod cluster control assemblies and, more particularly, to a reconstitutable rod cluster control assembly providing for selective removal and replacement of control rods.

(2) Description of the Prior Art

In a typical reactor core, such as a pressurized water-type reactor, the reactor core includes a multiplicity of fuel assemblies. The nuclear fission rate, and thus the rate of heat generation, in the core is controlled by varying the neutron flux of the core. The level of neutron flux and thus the heat output of the core is normally regulated by selective movement of control rods containing neutron absorbing material into and out of the core.

A conventional method for manipulating the control rods with respect to the core is to employ a rod cluster control assembly (RCCA). The RCCA typically comprises a control rod spider assembly which includes a plurality of control rods and a spider structure supporting the control rods at their upper ends. The spider structure, in turn, is connected to a control drive mechanism that vertically raises and lowers the control rods into and out of hollow guide tubes forming a part of fuel assemblies. A typical construction of the control rod used in such an arrangement is in the form of an elongated metallic cladding tube having a neutron absorbing material disposed within the tube and with end plugs at opposite ends thereof for sealing the absorber material within the tube.

The spider structure typically includes a plurality of radially extending vanes or fins supported on and circumferentially spaced about a central hub. The vanes are flat metal plates positioned on edge and connected by, for example, welds or brazements at their inner ends to the central hub. Cylindrical or tubular shaped control rod connecting fingers are mounted to and supported by the vanes, also by welds or brazements. Another spider structure includes a single-piece casting having a central hub with vanes or arms that support integrally casted bosses.

Typically, the upper end plug of each control rod has a threaded outer end which is screwed into the finger which includes a complementary interior threaded portion. Conventionally, the end plug is secured in engagement with the finger by a key or pin which is inserted through the side of the finger and into the end plug and welded in place. The key or pin serves to prohibit rotational movement of the plug with respect to the finger so that the control rod will not become unscrewed from the finger of the spider when in service.

A significant drawback of the conventional control rod spider assembly is that once it is assembled at a fabrication plant, it is not reconstitutable. That is, the assembly cannot readily be taken apart remotely and worn or damaged components replaced at a reactor site. Instead, the whole assembly must be discarded. This is of particular concern in the case of older nuclear reactor plants or in nuclear plants whose design results in uneven or premature wear or failure of individual control rods. Accordingly, great time and expense may be saved by the provision of means for coupling a control rod to a spider, the means allowing for convenient and secure removal and replacement of a control rod remotely at a reactor site.

Any means for coupling a control rod to a spider, reconstitutable or otherwise, must provide at least a minimum degree of security. In service, the control rods are subjected to substantial vibration and forces tending to separate the control rod from the spider. Accordingly, the provision of a threaded engagement between the control rod and the respective finger is not suitable for use in a nuclear reactor absent the provision of means to inhibit rotation of the control rod with respect to the finger.

U.S. Pat. No. 5,141,711 to Gjertsen et al. discloses a reconstitutable control assembly having removable control rods with detachable split upper end plugs. Multi-component locking features on the upper and lower plug portions lock them together so as to resist their unthreading from one another. However, the multiple components of the locking features disclosed in this patent are expensive. In addition, with this multi-component arrangement, straightness of the control rods can be degraded.

U.S. Pat. No. 5,183,626 to Denizou discloses an end part of a fuel rod which is integral with a ferrule. The ferrule is engaged when the rod is screwed into the bore. Deformation of the ferrule prevents rotation of the rod. The rod is demounted by exerting a torque on it. However, this design does not allow flexibility of the joint, which is necessary for proper performance in some reactors. In addition, this design could allow the joint to loosen during reactor operation and could permit straightness of the rods to be degraded.

Thus, there exists a need for a reconstitutable rod cluster control assembly which includes means for conveniently and securely removing and replacing control rods while, at the same time, will not loosen during ordinary usage.

SUMMARY OF THE INVENTION

The present invention is directed to a rod connector assembly for removably securing a control rod to a spider structure and adapted for use in conjunction with a crimping tool. The rod connector assembly includes a tubular boss fixedly secured to the spider structure, the boss including at least one access hole formed therein and interior threads formed on an interior surface of the boss. A securement structure includes a coupling adapted to be fixedly secured to the control rod.

The coupling includes a shaft having external threads formed thereabout, an upper end, and a lower end, the lower end of the shaft adapted to be fixedly secured to the control rod; a deformable collar projecting upwardly from the upper end of the shaft; and a cap adapted to be fixedly secured to an upper end of the boss and including at least one groove corresponding to the access hole or holes in the boss.

In use, when the external threads are engaged with the interior threads, the deformable collar is disposed within the boss and is accessible through the access hole(s) so that the deformable collar may be deformed using the crimping tool from exteriorly of the boss to form a crimped region. As a result the crimped region resists rotation of the external threads with respect to the internal threads unless it is overcome with a predetermined amount of torque to permit disassembly of the rod connector.

Accordingly, one aspect of the present invention is to provide a rod connector assembly for removably securing a control rod to a spider structure and adapted for use in conjunction with a crimping tool. The rod connector assembly includes: (a) a tubular boss fixedly secured to the spider structure, the boss including at least one access hole formed therein and interior threads formed on an interior surface of the boss; (b) a securement structure including a coupling adapted to be fixedly secured to the control rod and having external threads adapted to engage the interior threads, the securement structure including a deformable member; (c) wherein, when the external threads are engaged with the interior threads, the deformable member is disposed within the boss and is accessible through the at least one access hole so that the deformable member may be deformed using the crimping tool from exteriorly of the boss to form a crimped region; and (d) wherein the crimped region resists rotation of the external threads with respect to the internal threads.

Another aspect of the present invention is to provide a securement structure for removably mounting a control rod in a tubular boss, the boss having an upper end, at least one access hole and interior threads. The securement structure is adapted for use with a crimping tool and includes: (a) a cap adapted to be fixedly secured to the upper end of the boss and including at least one groove; (b) a coupling including: (i) a shaft having external threads formed thereabout, an upper end, and a lower end, the lower end of the shaft adapted to be fixedly secured to the control rod; and (ii) a deformable collar projecting upwardly from the upper end of the shaft; and (c) wherein, when the external threads are engaged with the interior threads, the collar is disposed adjacent the groove.

Still another aspect of the present invention is to provide a rod connector assembly for removably securing a control rod to a spider structure and adapted for use in conjunction with a crimping tool. The rod connector assembly includes: (a) a tubular boss fixedly secured to the spider structure, the boss including at least one access hole formed therein and interior threads formed on an interior surface of the boss; (b) a securement structure including a coupling adapted to be fixedly secured to the control rod, the coupling including: (i) a shaft having external threads formed thereabout, an upper end, and a lower end, the lower end of the shaft adapted to be fixedly secured to the control rod; and (ii) a deformable collar projecting upwardly from the upper end of the shaft; and (iii) a cap adapted to be fixedly secured to an upper end of the boss and including at least one groove; (c) wherein, when the external threads are engaged with the interior threads, the deformable collar is disposed within the boss and is accessible through the at least one access hole so that the deformable collar may be deformed using the crimping tool from exteriorly of the boss to form a crimped region; and (d) wherein the crimped region resists rotation of the external threads with respect to the internal threads.

These and other aspects of the present invention will become apparent to those skilled in the art after a reading of the following description of the preferred embodiment when considered with the drawings.

BRIEF DESCRIPTION OF THE DRAWINGS

FIG. 2 is a cross-sectional, fragmentary view of the rod cluster control assembly viewed along the line 2—2; and FIG. 3 is a cross-sectional view of the rod connector assembly viewed along the line 3—3.

DESCRIPTION OF THE PREFERRED EMBODIMENTS

Figure 1:
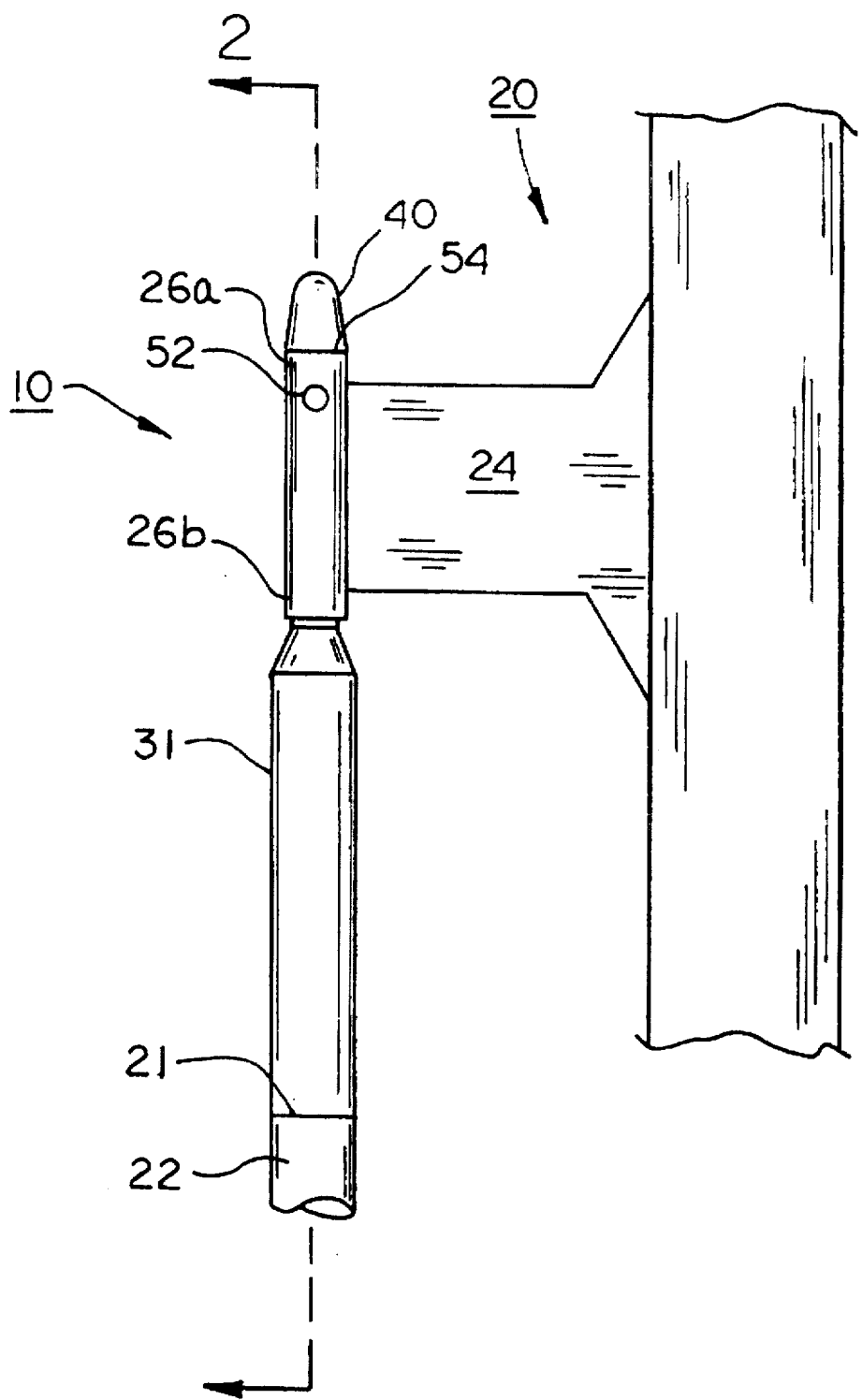
FIG. 1 is a schematic, fragmentary view of a rod cluster control assembly including a rod connector assembly constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a rod cluster control assembly 20 and a control rod 22 supported thereby are shown therein. The rod connector assembly of the present invention, generally denoted by the numeral 10, removably secures control rod 22 to vane 24, as discussed in more detail below.

As best seen in FIG. 2, rod connector assembly 10 includes cap 40, tubular boss 26, and coupling 30. Boss 26 is fixedly secured to vane 24 by welding, casting, or any other suitable method. Boss 26 is generally hollow and tubular and includes upper end 26a and lower end 26b. Interiorly threaded portion 25 is provided proximate upper end 26a. Access holes 52 are formed on opposite sides of boss 26.

Coupling 30 includes intermediate shaft 32, and plug 31 and head 34 formed on opposite ends of shaft 32. Plug 31 is integrally and permanently joined to the upper end of control rod 22 in conventional fashion, such as by weld 21. Head 34 includes threads 35 which are complementary to threaded portion 25. Cylindrical collar 36 extends upwardly from head 34.

Cap 40 includes downwardly projecting projection 42. Projection 42 has vertically extending grooves 44 formed therein. When cap 40 is mounted in boss 26, grooves 44 are disposed adjacent respective access holes 52. When control rod 22 and coupling 30 are mounted as shown in FIG. 2, projection 42 is disposed within collar 36. Cap 40 is held in place on boss 26 by weld 54. Alternatively, cap 40 may be integrally formed with boss 26.

Collar 36 is formed from a selectively deformable material. Preferably, collar 36 is formed from annealed stainless steel; however, any suitable material may be used. When control rod 22 is mounted in boss 26 for service within the reactor, collar 36 includes two crimps or deformations 50 as shown in FIGS. 2 and 3. Crimps 50 project into collar 36 so that they are disposed within respective grooves 44.

It will be appreciated that any forces urging rotation of collar 36 about projection 42 will be resisted by the interface of crimps 50 and grooves 44. Accordingly, relative rotation of threads 35 (and hence control rod 22) and threaded portion 25 will be resisted as well. The dimensions and material of collar 36 as well as the geometries and sizes of crimps 50 are chosen such that crimps 50 may be deformed upon application of a prescribed amount of torque. The amount of torque required to deform crimps 50 is preferably in the range of from about 20 inch-pounds to about 60 inch-pounds.

Control rod 22 may be mounted on vane 24 and selectively demounted from the vane according to the following method. Cap 40 is welded onto or integrally formed with boss 26 such that projection 42 is disposed in the upper end thereof. Plug 31 is integral with or fixedly secured to the upper end of control rod 22. Coupling 30 is inserted into boss 26 through the lower end 26b thereof. Once threads 35 of head 34 engage threaded portion 25, control rod 22 is rotated to engage threads 25 and 35. As coupling 30 moves up into boss 26, collar 36 receives and surrounds projection 42. Once rod 22 has been screwed into boss 26 to the desired position, a suitable crimping tool, for example, a hydraulic pinching tool, is inserted through each of holes 52 to deform collar 36 as shown.

When it is desired to remove rod 22, rod 22 is rotated with the prescribed degree of torque or greater so that crimps 50 are deformed, allowing collar 36 to rotate about projection 42 with a nominal degree of frictional resistance.

Notably, only coupling 30 is damaged by the process of installing and removing rod 22. A replacement rod with a new coupling 30 may be installed in boss 26 and using cap 40 without requiring any repair or resetting of the boss and the cap. With the prior art designs using a pin that is welded in place to prevent control rod rotation, the rod connector assembly is not reconstitutable. The present design allows the rod connector assembly to be reconstituted yet will not allow the rods to loosen during reactor operation.

Certain modifications and improvements will occur to those skilled in the art upon a reading of the foregoing description. By way of example, the crimp geometry could take on other forms such as linear crimps or round, dimpled crimps. In addition, any number of crimps and corresponding grooves, from one to any practical number, could be provided to prevent the rods from rotating. The number and shapes of the crimps could be modified to form a rigid connection, as opposed to a flexible joint, between the control rod and the rod cluster control assembly. Also, the collar could be fabricated of a resilient material that returns to its original shape after deformation. With such a collar construction, the crimps in the collar could be formed during fabrication. Then, as the collar engages the projection beneath the cap, the crimps would click into place in the grooves. Reconstitution would therefore not require re-crimping. At the reactor site, if wear was discovered on only one side of a control rod, the control rod could be rotated 90 or 180 degrees and clicked into place in this new position.

It should be understood that all such modifications and improvements have been deleted herein for the sake of conciseness and readability but are properly within the scope of the following claims.

We claim:

1. A rod connector assembly for removably securing a control rod to a spider structure, said rod connector assembly comprising:

(a) a tubular boss fixedly secured to the spider structure, said boss including at least one access hole formed therein and interior threads formed on an interior surface of said boss;

(b) a securement structure including a coupling adapted to be fixedly secured to the control rod and having external threads adapted to engage said interior threads, said securement structure including a deformable member;

(c) wherein, when said external threads are engaged with said interior threads, said deformable member is disposed within said boss and is accessible through said at least one access hole; and (d) a crimped region formed in said deformable member for resisting rotation of said external threads with respect to said internal threads, wherein said securement structure further includes a cap adapted to be fixedly secured to an upper end of said boss and including at least one groove, wherein said cap further includes a projection extending into said boss, said at least one groove formed in said projection, wherein, when said cap is secured to said upper end of said boss and said external threads are engaged with said interior threads, said projection is disposed within said collar.

2. A securement structure for removably mounting a control rod in a tubular boss, the boss having an upper end, at least one access hole and interior threads, said securement structure comprising:

a cap adapted to be fixedly secured to the upper end of the boss and including at least one groove;

(b) a coupling including: (i) a shaft having external threads formed thereabout, an upper end, and a lower end, said lower end of said shaft adapted to be fixedly secured to the control rod; and (ii) a deformable collar projecting upwardly from said upper end of said shaft;

(c) wherein, when said external threads are engaged with the interior threads, said collar is disposed adjacent said at least one groove; and (d) wherein said cap further includes a projection extending into the boss, said at least one groove formed in said projection, wherein, when said cap is secured to the upper end of the boss and said external threads are engaged with the interior threads, said projection is disposed within said collar.

3. A rod connector assembly for removably securing a control rod to a spider structure, said rod connector assembly comprising:

(a) a tubular boss fixedly secured to the spider structure, said boss including at least one access hole formed therein and interior threads formed on an interior surface of said boss;

(b) a securement structure including a coupling adapted to be fixedly secured to the control rod, said coupling including: (i) a shaft having external threads formed thereabout, an upper end, and a lower end, said lower end of said shaft adapted to be fixedly secured to the control rod; (ii) a deformable collar projecting upwardly from said upper end of said shaft; and (iii) a cap adapted to be fixedly secured to an upper end of said boss and including at least one groove;

(c) wherein, when said external threads are engaged with said interior threads, said deformable collar is disposed within said boss and is accessible through said at least one access hole; and (d) a crimped region formed in said deformable collar for resisting rotation of said external threads with respect to said internal threads, wherein said cap further includes a projection extending into said boss, said at least one groove formed in said projection, wherein, when said cap is secured to said upper end of said boss and said external threads are engaged with said interior threads, said projection is disposed within said collar.

4. The apparatus according to claim 3, wherein said cap further includes a projection extending into the boss, said at least one groove formed in said projection, wherein, when said cap is secured to the upper end of the boss and said external threads are engaged with the interior threads, said projection is disposed within said collar.

* * * * *